United States Patent Office 2,909,520
Patented Oct. 20, 1959

2,909,520

PROCESS FOR MAKING ACYLATED LEUCOMETHYLENE BLUE

Saul Rex Buc, Easton, Pa., assignor to General Aniline & Film Corporation, New York, N.Y., a corporation of Delaware No Drawing. Application December 6, 1957
Serial No. 700,968

17 Claims. (Cl. 260—243)

This invention relates to a new process for preparing acylated leucomethylene blue in excellent yields and of an outstanding and superior degree of purity, and in particular to the preparation of benzoyl and substituted benzoyl leucomethylene blues.

Benzoyl leucomethylene blue has recently come to the forefront as an important product useful in the manufacture of the so-called "carbonless carbon papers." With such papers, copies are produced in a manner similar to "carbon copies" except that no carbon paper interleaving is necessary. By the mere application of pressure a mark is produced due to the chemical interaction of the benzoyl leucomethylene blue with other ingredients present in or on the paper or in or on an adjacent paper. For such usage the benzoyl leucomethylene blue must have no trace of color and must be of exceptional purity, that is, completely free of unconverted methylene blue or leucomethylene blue, and also free of contaminating color-forming substances such as metals, for example, iron.

It is an object of this invention to provide a new process for preparing acylated leucomethylene blue and in particular benzoyl leucomethylene blue and substituted benzoyl leucomethylene blue of an exceptional degree of purity.

It is a further object of this invention to provide a process for the preparation of high quality acylated leucomethylene blue and in particular benzoyl leucomethylene blue and substituted benzoyl leucomethylene blue in excellent yields.

Other objects will appear hereinafter as the description proceeds. The objects of this invention are accomplished by carrying out the reduction of the unconverted methylene blue under carefully controlled conditions and following this step with one of acylation of the resultant leucomethylene blue in the presence of critical reagents and under selected conditions.

The general procedure involves conducting the reduction of the methylene blue to the leuco form thereof in the presence of a water immiscible organic liquid which is a solvent for the desired acylated leucomethylene blue. After the dye has been converted to the leuco form the acylation step is then carried out in a carefully controlled acid medium between a pH of above 3 and below 6, and preferably at a pH of 4, after which the acylated leucomethylene blue is isolated by conventional procedures.

The reduction of the dyestuff to the leuco form is conducted preferably with hydrosulfite but, of course, other reducing agents may be employed which do not adversely affect the purity or the yield of the desired product.

Among the water-immiscible organic liquids which are solvents for the acylated leucomethylene blue and which may be employed are the following:

Benzene
Toluene
Xylenes
Chlorobenzene
o-Dichlorobenzene
m-Dichlorobenzene
Trichlorobenzene
Chloroform
Carbon tetrachloride
Trichloroethylene and mixtures of these liquids.

The acylating agent as described above is preferably one which introduces a benzoyl or substituted benzoyl radical into the leucomethylene blue molecule but other aromatic, carbocyclic acylating agents may be employed. Thus, in addition to benzoyl chloride, there may be used the following acid chlorides:

Ortho-toluoyl bromide
Meta-toluoyl bromide
Para-toluoyl bromide
Para-toluoyl chloride
Ortho-toluoyl chloride
Meta-toluoyl chloride
2,4-dimethyl benzoyl chloride
2,3-xyloyl chloride
3,5-xyloyl chloride
2-ethyl benzoyl chloride Halo-benzoyl halide, e.g.
    o-Chlorobenzoyl chloride
    m-Chlorobenzoyl chloride
    p-Chlorobenzoyl chloride
    2,3-dichlorobenzoyl chloride
    2,4-dichlorobenzoyl chloride
    2,5-dichlorobenzoyl chloride
    2,6-dichlorobenzoyl chloride
    3,4-dichlorobenzoyl chloride
    3,5-dichlorobenzoyl chloride
    2,3,5-trichlorobenzoyl chloride
    2,4,5-trichlorobenzoyl chloride
    2,4,6-trichlorobenzoyl chloride
    3,4,5-trichlorobenzoyl chloride
    2,3,4,5-tetrachlorobenzoyl chloride
    Penta-chlorobenzoyl chloride
    o-Bromobenzoyl chloride
    m-Bromobenzoyl bromide
    p-Bromobenzoyl chloride
    o-Bromobenzoyl bromide
    m-Bromobenzoyl bromide
    p-Bromobenzoyl bromide
    3,5-dibromobenzoyl chloride
    2,5-dibromobenzoyl-4-methylbenzoyl chloride
    Chlorotoluoyl chloride
    2,6-dibromo-4-methylbenzoyl chloride
    2,6-dibromobenzoyl chloride
    2,4-dibromobenzoyl chloride Nitro-containing halides, e.g.
    3-nitrobenzoyl chloride
    3-nitrobenzoyl bromide
    4-nitrobenzoyl chloride
    4-nitrobenzoyl bromide
    2,4-dinitrobenzoyl chloride
    2,6-dinitrobenzoyl chloride
    3,5-dinitrobenzoyl chloride
    3-nitro-2-methylbenzoyl chloride
    5-nitro-2-methylbenzoyl chloride
    2-nitro-3-methylbenzoyl chloride
    2-nitro-4-methylbenzoyl chloride
    3-nitro-4-methylbenzoyl chloride
    3,5-dinitro-4-methylbenzoyl chloride
    3,5-dinitrobenzoyl bromide Halo-nitro-containing halides, e.g.
    2-bromo-4-nitrobenzoyl chloride
    2-chloro-3-nitrobenzoyl chloride
    2-chloro-4-nitrobenzoyl chloride 2-chloro-5-nitrobenzoyl chloride
3-nitro-4-bromobenzoyl chloride
3-nitro-6-bromobenzoyl chloride
2,4,6-trichloro-3-nitrobenzoyl chloride
6-bromo-3-nitro-4-methylbenzoyl chloride
3,5-dinitro-4-methyl-2-bromobenzoyl chloride
2-chloro-3,5-dinitrobenzoyl chloride 2-trichloromethyl benzoyl chloride
2-methoxy benzoyl chloride
3-methoxy benzoyl chloride
4-methoxy benzoyl chloride
2-propyloxy benzoyl chloride
3-ethoxy benzoyl chloride
2-acetoxy benzoyl chloride
4-ethoxy benzoyl chloride
4-propyloxy benzoyl chloride
4-isoamyloxy benzoyl chloride
4-benzyloxy benzoyl chloride
4-acetoxy benzoyl chloride
Carbomethoxy salicylic acid chloride $$(CH_3OCO.OC_6H_4COCl)$$

2-acetoxy-3-methyl benzoyl chloride
6-acetoxy-3-methyl benzoyl chloride
3,4-dimethoxy benzoyl chloride
3,5-dimethoxy benzoyl chloride
alpha-napthoyl chloride
beta-naphthoyl chloride
3-chloro-$\beta$-naphthoyl chloride
4-methyl-$\alpha$-napthoyl chloride
2-methyl-$\alpha$-naphthoyl chloride
2-bromomethyl-$\alpha$-naphthoyl bromide
$\alpha$-Chloro-$\beta$-naphthoyl chloride
5-bromo-1-naphthoyl chloride
1-methoxy-2-naphthoyl chloride
1-[carbomethoxy-oxy]-2-naphthoyl chloride $$(CH_3.OOC.O.C_{10}H_6COCl)$$

3-[carbomethoxy-oxy]-2-naphthoyl chloride
Orthophenyl benzoyl chloride
Metaphenyl benzoyl chloride
Paraphenyl benzoyl chloride
Methylbenzyl benzoyl chloride It has been discovered that the use of a metal sequestering agent in the process is desirable to reduce to an absolute minimum the deleterious effects of traces of metals in the final product. Since such traces of metals, and in particular iron, normally occur in most commercial chemical and reagents unless specifically excluded, and since these metals lead to objectionable color bodies in the final product, their removal is most desirable. While it is possible to employ reagents absolutely free of these contaminating metals, from a practical viewpoint it is unnecessary to make this either a necessary or rigid requirement since by the use of sequestering agents, the effects of any metals present can be obviated. As suitable sequestrants there may be employed the following:

Ethylenediamine tetra acetic acid
$\beta$-Hydroxyethyl ethylene diamine triacetic acid
Triethanolamine
Citric acid
Bis-N($\beta$-hydroxyethyl) glycine
Gluconic acid
tartaric acid The amounts of such agents to be employed is not critical and depends entirely on the amount of contaminating metal, since usually, only small amounts or traces of these metals are present from about 1% to about 20% based on the weight of the original unconverted dyestuff is normally sufficient. It is of course understood that smaller or greater amounts may be used dictated solely by the amount of metal contaminant present.

The general procedure for isolating the acylated leucomethylene blue involves a separation of the aqueous and nonaqueous liquid phases and recovery of the acylated product from the non-aqueous phase usually by a vacuum distillation. It is advantageous before separating the two liquid phases to adjust the pH from 4 to the alkaline side (about 10) and to treat them with an adsorptive agent to further remove undesirable by-product and color bodies. Suitable adsorption agents include:

Decolorizing charcoal
Decolorizing carbon
Attapulgus clay and mixture of these agents, and the like.

In the following examples, serving to illustrate the present invention and not being deemed limitative thereof, the amounts of the various ingredients employed are, where not otherwise indicated, in parts by weight.

*Example 1*

In a stirred flask charge the following 300 ml. distilled water
32 g. methylene blue chloride
   (C.I. 922)
250 ml. chlorobenzene
5 g. ethylene diamine tetra acetic acid then add 13.3 ml. of 15 N sodium hydroxide followed by 36 g. sodium hydrosulfite. As reduction proceeds, the pH drops to about 6.3. After about 5 minutes add 35 ml. benzoyl chloride. As the benzoylation proceeds, the pH drops. Let the pH drop to 4.0 and maintain it at this value by adding sodium hydroxide solution as needed. Continue stirring for about 2 hours at this pH. Add:

5 g. decolorizing charcoal and
7 g. Attapulgus clay

Adjust the pH to 10 by adding sodium hydroxide solution, then filter, separate the liquid layers and discard the aqueous layer. The organic layer is distilled to dryness under a vacuum. The resultant residue is a crystalline product of benzoyl leucomethylene blue. Yield is 36 g. (93% of theory).

*Example 2*

The following ingredients are charged into a well-stirred flask:

200 ml. distilled water
19.3 g. methylene blue.$ZnCl_2$
75 ml. chloroform

To this mixture is then added 70 g. sodium carbonate and then, further, 18 g. sodium hydrosulfite are added. After about 6 minutes add 29 ml. benzoyl chloride. The pH of the reaction mass drops as the benzoylation proceeds and when it reaches about a pH of 4 add a 10 N sodium hydroxide solution to maintain the pH at this value. Continue the stirring for about 2½ hours at this pH and then add 5 g. of Attapulgus clay. Adjust the pH to 10 by adding 10 N sodium hydroxide solution, then filter, separate the liquid layers and discard the aqueous layer. 18.2 g. of a crystalline residue of benzoyl leucomethylene blue is recovered by a vacuum distillation of the organic layer to dryness. Yield is 94% of theory.

*Example 3*

The procedure of Example 1 is repeated employing 200 ml. of carbon tetrachloride in lieu of chlorobenzene as the water-immiscible solvent. The yield of benzoylated leucomethylene blue is 37 g.

*Example 4*

The procedure of Example 2 is repeated employing 100 ml. of toluene in lieu of chloroform as the water-immiscible solvent. The yield is 19 g. of benzoyl leucomethylene blue.

Example 5

The procedure of Example 1 is repeated employing 38 ml. of p-toluoyl chloride in lieu of benzoyl chloride as the acylating agent. The yield is 37.5 of acylated product.

Example 6

The procedure of Example 3 is repeated employing in lieu of benzoyl chloride, 50 ml. α-naphthoyl chloride as the acylating agent. The yield is 38 g. of α-naphthoyl leucomethylene blue.

Example 7

The procedure of Example 4 is repeated using 50 ml. of β-naphthoyl chloride in lieu of the benzoyl chloride as the acylating agent. The yield is 38.2 g. of β-naphthoyl leucomethylene blue.

Example 8

To the following mixture:

300 ml. $H_2O$
26 g. methylene blue.$ZnCl_2$
125 ml. trichloroethylene, and
4 g. hydroxyethyl ethylenediamine triacetic acid, contained in a well-stirred flask add 15 ml. of 10 N sodium hydroxide followed by 25 g. of sodium hydrosulfite. After several minutes add 40 ml. of benzoyl chloride. The pH drops slowly as benzoylation proceeds. Let the pH drop to 4 and maintain it at this value for 2 hours by adding a solution of 10 N sodium hydroxide as needed. Isolate the benzoyl leucomethylene blue as described in Example 1. The yield is 25 g. of benzoyl leucomethylene blue.

Example 9

The procedure of Example 8 is repeated employing 150 ml. of o-dichlorobenzene in lieu of trichloroethylene. The yield is 25.2 g. of benzoyl leucomethylene blue.

Example 10

The procedure of Example 8 is repeated using 3 g. of the compound citric acid as the sequestering agent. The yield is 24.8 g. of benzoyl leucomethylene blue.

Example 11

The procedure of Example 8 is repeated except that in the isolation of the benzoylated product 10 g. of decolorizing carbon is employed in lieu of the charcoal-clay mixture used in that procedure. The yield of high quality benzoyl leucomethylene blue is 24.8 g.

Example 12

The procedure of Example 11 is repeated employing in lieu of benzoyl chloride an equivalent amount of p-toluoyl chloride. A high quality p-toluoyl leucomethylene blue is obtained.

Example 13

To a mixture of 300 ml. $H_2O$
26 g. methylene blue.$ZnCl_2$
150 ml. benzene in a well-stirred flask add 12 ml. of 15 N sodium hydroxide followed by 25 g. of sodium hydrosulfite. After about 5 minutes add 40 ml. of benzoyl chloride. Maintain the pH of the reaction mass at a value of 4, adding sodium hydroxide solution (15 N) as necessary. Continue stirring for about 2 hours at this pH and complete the process as described in Example 1. A very pure and excellent yield of benzoyl leucomethylene blue is obtained.

Example 14

The procedure of Example 13 is repeated employing 175 ml. chlorobenzene as the water-immiscible solvent and in lieu of benzoyl chloride as the acylating agent, an equivalent amount of p-toluoyl chloride is used.

Example 15

The procedure of Example 13 is repeated using 150 ml. of trichloroethylene as the water-immiscible solvent.

In the following examples, the procedure of Example 1 is repeated except that instead of benzoyl chloride, an equivalent amount of the recited acylating agent is employed.

| Example | Acylating Agent | Yield | Remarks |
|---|---|---|---|
| 16 | ortho-toluoyl bromide | Very good | pure product. |
| 17 | p-chlorobenzoyl chloride | Excellent | Do. |
| 18 | 3,5-dichlorobenzoyl chloride | do | Do. |
| 19 | 2,3,4,5-tetrachlorobenzoyl chloride. | do | Do. |
| 20 | o-bromobenzoyl bromide | do | Do. |
| 21 | 2,5-dibromo-4-methyl benzoyl chloride. | do | Do. |
| 22 | p-nitrobenzoyl bromide | do | Do. |
| 23 | 2-nitro-4-methylbenzoyl chloride. | do | Do. |
| 24 | 2-bromo-4-nitrobenzoyl chloride. | do | Do. |
| 25 | 2,4,6 - trichloro - 3 - nitrobenzoyl chloride. | do | Do. |
| 26 | 3,5 - dinitro - 4 - methyl - 2 - bromo benzoyl chloride. | do | Do. |
| 27 | 2-trichloromethyl benzoyl chloride. | do | Do. |
| 28 | 2-methoxy benzoyl chloride | do | Do. |
| 29 | 3-ethoxy benzoyl chloride | do | Do. |
| 30 | 4-isoamyloxy benzoyl chloride | do | Do. |
| 31 | 4-acetoxy benzoyl chloride | do | Do. |
| 32 | 4-benzyloxy benzoyl chloride | do | Do. |
| 33 | carbomethoxy salicylic acid chloride. | do | Do. |
| 34 | 3-chloro-β-naphthoyl chloride | do | Do. |
| 35 | methylbenzyl benzoyl chloride. | do | Do. |

In the following examples the procedure of Example 2 is repeated using, however, the following acylating agents in equivalent amounts.

| Example | Acylating Agent | Yield | Remarks |
|---|---|---|---|
| 36 | 3,4-dimethoxy benzoyl chloride | Excellent | very pure product. |
| 37 | 4-propyloxy benzoyl chloride | do | Do. |
| 38 | o-phenyl benzoyl chloride | do | Do. |
| 39 | 1-methoxy-2-naphthoyl chloride | do | Do. |
| 40 | 5-bromo-1-naphthoyl chloride | do | Do. |

In the following examples the procedure of Example 8 is repeated using equivalent amounts of the following acylating agents in lieu of benzoyl chloride.

| Example | Acylating Agent | Yield | Remarks |
|---|---|---|---|
| 41 | 1 - [carbomethoxy - oxy] - 2 - naphthoyl chloride. | Excellent | Pure product. |
| 42 | 3-methoxybenzoyl chloride | do | Do. |
| 43 | 4-methyl-α-naphthoyl chloride | do | Do. |
| 44 | 2,4,6-trichlorobenzoyl chloride | do | Do. |
| 45 | 3,5-xyloyl chloride | do | Do. |

In the following examples the procedure of Example 13 is repeated using, additionally, citric acid as the sequestrant with the following acylating agents.

| Example | Acylating Agent | Yield | Remarks |
|---|---|---|---|
| 46 | 2-ethylbenzoyl chloride | Excellent | Pure product. |
| 47 | pentachlorobenzoyl chloride | do | Do. |
| 48 | 3 - nitro - 4 - methylbenzoyl chloride. | do | Do. |
| 49 | 3 - chloro - 2 - nitrobenzoyl chloride. | do | Do. |
| 50 | 2-chloro - 3, 5 - dinitrobenzoyl chloride. | do | Do. |

While in the specific examples and illustrations given above in most instances the acylating agent employed is the chloride and in some instances the bromide, it is of course understood that any halide may be employed the nature of which is immaterial for the purposes of the present invention. Other variations in and modifications of the described processes which will be obvious to those skilled in the art can be made in this invention without departing from the scope or the spirit thereof.

This application is a continuation-in-part of my application Serial No. 545,794, filed November 8, 1955, now abandoned.

I claim:

1. A process for the preparation of acylated leucomethylene blue which comprises introducing an acyl grouping in the nitrogen atom of the leucomethylene blue by reacting said leucomethylene blue with a carbocyclic aromatic carboxylic acylating agent in an aqueous medium and in the presence of a water-immiscible solvent at a pH below about 6.

2. A process as defined in claim 1 wherein the pH is between about 3 and about 5, inclusive.

3. A process as defined in claim 1 wherein the pH is about 4.

4. A process as defined in claim 3 wherein the acylating agent is benzoyl chloride.

5. A process for preparing benzoyl leucomethylene blue which comprises treating leucomethylene blue in an aqueous medium and in the presence of a water-immiscible organic solvent with a benzoylating agent and maintaining a pH below about 6 during the benzoylation and isolating the resultant benzoylated product in the water-immiscible solvent.

6. A process as defined in claim 5 wherein the pH is maintained at about 4.

7. A process as defined in claim 6 wherein the organic solvent is chlorobenzene.

8. A process as defined in claim 6 wherein the organic solvent is dichlorobenzene.

9. A process as defined in claim 6 wherein the organic solvent is chloroform.

10. A process as defined in claim 5 wherein a metal sequestrant is employed in the reaction medium.

11. A process for preparing benzoyl leucomethylene blue which comprises treating leucomethylene blue in an aqueous medium, and in the presence of a water-immiscible organic liquid which is a solvent for said benzoyl leucomethylene blue and a metal sequestrant, with a benzoylating agent, and maintaining a pH below about 6 during the benzoylation, and isolating the resultant benzoyl leucomethylene blue.

12. A process as defined in claim 11 wherein the pH is maintained at about 4.

13. A process as defined in claim 12 wherein the organic solvent for the benzoyl leucomethylene blue is chlorobenzene.

14. A process as defined in claim 12 wherein the organic solvent for the benzoyl leucomethylene blue is dichlorobenzene.

15. A process as defined in claim 12 wherein the organic solvent for the benzoyl leucomethylene blue is chloroform.

16. A process as defined in claim 2 wherein the acylating agent is halogenated benzoyl chloride.

17. A process as defined in claim 2 wherein the acylating agent is nitro benzoyl chloride.

References Cited in the file of this patent

UNITED STATES PATENTS

| | | |
|---|---|---|
| 2,783,227 | Adams | Feb. 26, 1957 |
| 2,784,186 | Adams | Mar. 5, 1957 |

FOREIGN PATENTS

| | | |
|---|---|---|
| 113,721 | Germany | Sept. 28, 1900 |
| 725,275 | Great Britain | Mar. 2, 1955 |

OTHER REFERENCES

Cauquil et al.: Bull. Soc. Chim., vol. 17 (No. 12), p. 1037, (Nov.–Dec. 1950).